United States Patent

Sato

[11] Patent Number: 5,533,925
[45] Date of Patent: Jul. 9, 1996

[54] STRUCTURE OF DRIVE SECTION OF POWER TOOL

[75] Inventor: Hiroshi Sato, Fuchu, Japan

[73] Assignee: Ryobi Limited, Hiroshima-ken, Japan

[21] Appl. No.: 192,037

[22] Filed: Feb. 4, 1994

[30] Foreign Application Priority Data

Feb. 5, 1993 [JP] Japan ................ 5-003017 U

[51] Int. Cl.⁶ ........................................ B24B 23/04
[52] U.S. Cl. ............................... 451/344; 451/163
[58] Field of Search ................. 451/162, 163, 451/164, 344, 351, 356, DIG. 906

[56] References Cited

U.S. PATENT DOCUMENTS

| | | | |
|---|---|---|---|
| 2,163,018 | 6/1939 | Bernier | 451/356 |
| 2,350,098 | 5/1944 | Decker | 451/356 |
| 3,136,099 | 6/1964 | Tully et al. | 451/356 |
| 4,175,359 | 11/1979 | Teague, Jr. et al. | |
| 4,512,207 | 4/1985 | Dancsik | 451/356 |
| 4,575,973 | 3/1986 | Izumisawa | 451/356 |
| 4,703,536 | 11/1987 | Livneh | 451/356 |

FOREIGN PATENT DOCUMENTS

| | | |
|---|---|---|
| 3510333 | 9/1986 | Germany . |
| 63-212457 | 9/1988 | Japan . |
| 438688 | 9/1992 | Japan . |

*Primary Examiner*—Maurina T. Rachuba
*Attorney, Agent, or Firm*—Brooks & Kushman

[57] ABSTRACT

An output axis of a motor has an eccentric portion, a vibratory arm is vibratably supported at its central portion, connecting section of said vibratory arm with the eccentric portion is formed in shape of two crotches, the eccentric portion and the vibratory arm are connected to each other in a manner that the eccentric portion is inserted between the two crotches of the vibratory arm, thereby rotational movement of the output axis of the motor is converted into vibrational movement of the vibratory arm, and at least one of contact portion formed on the outer circumfrential surface of the eccentric portion or contact portions respectively formed on the inside surface of each of two crotches is formed in shape of a curved surface.

12 Claims, 6 Drawing Sheets

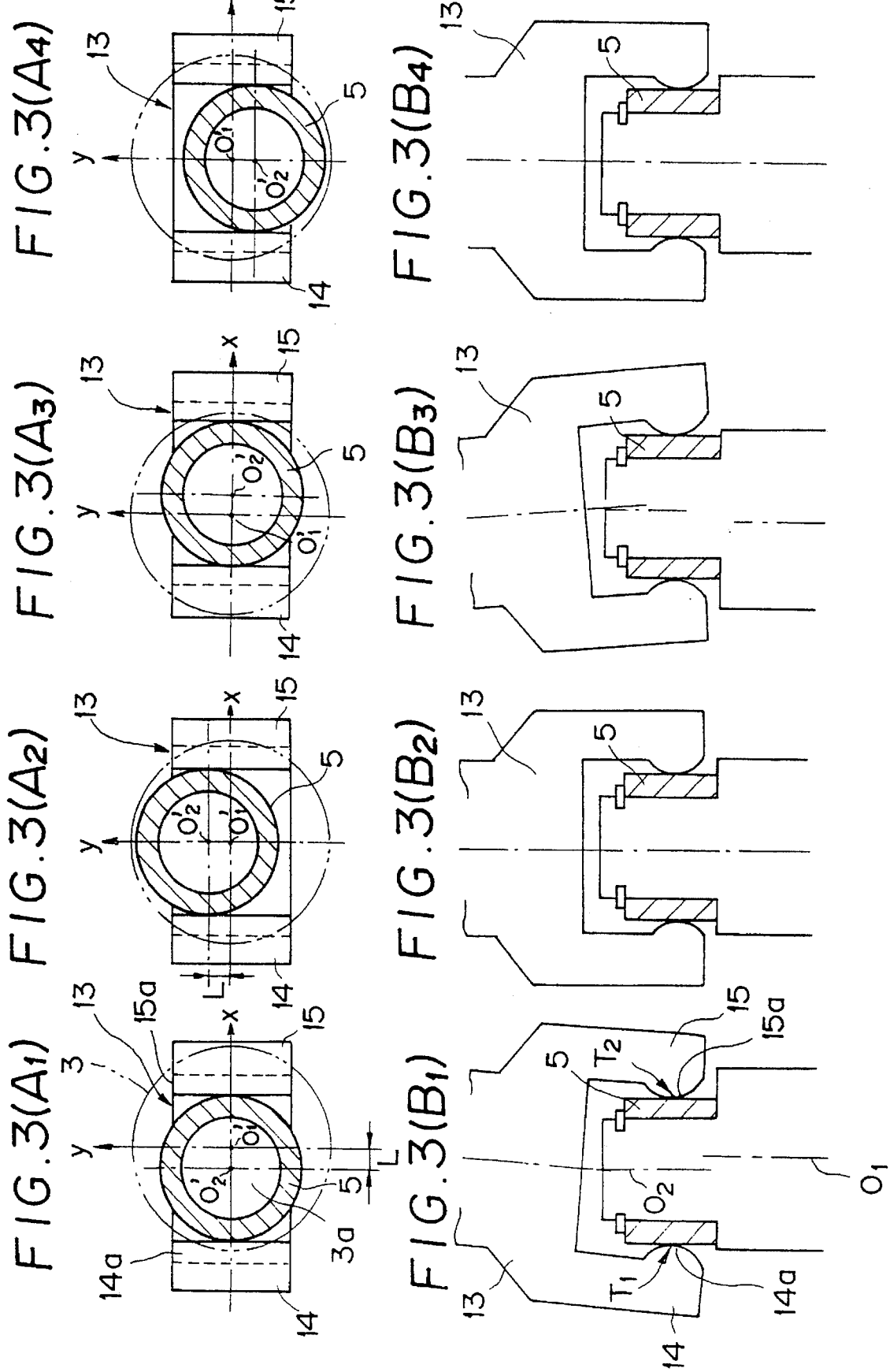

PRIOR ART
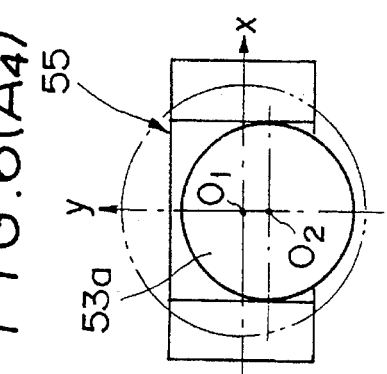
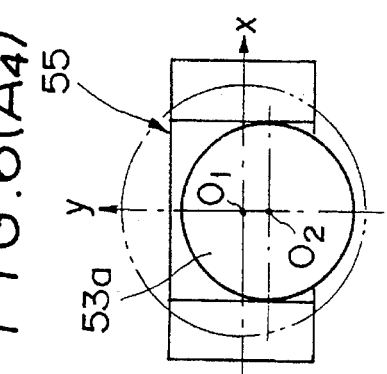
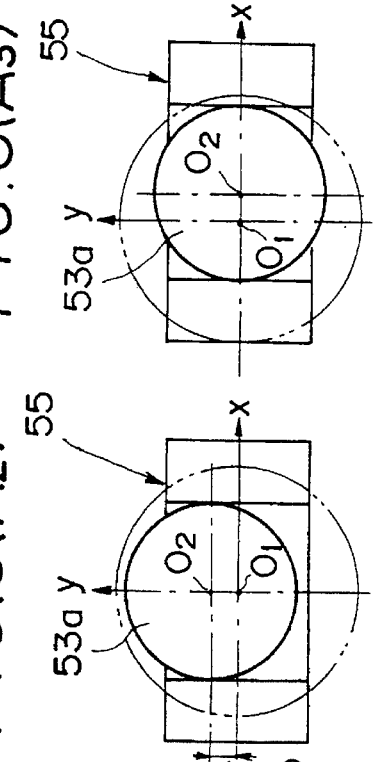
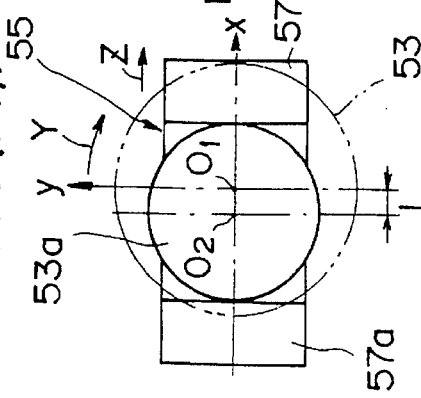
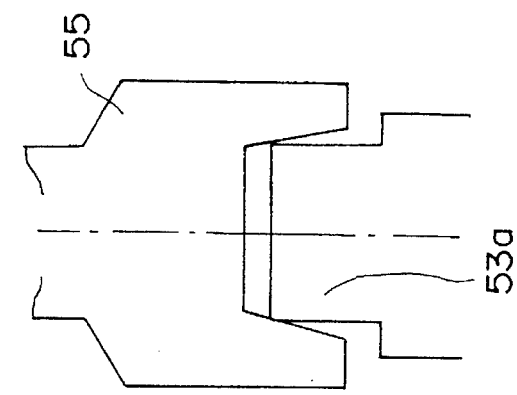
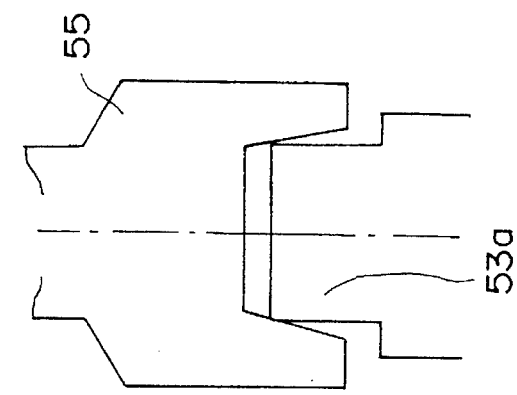
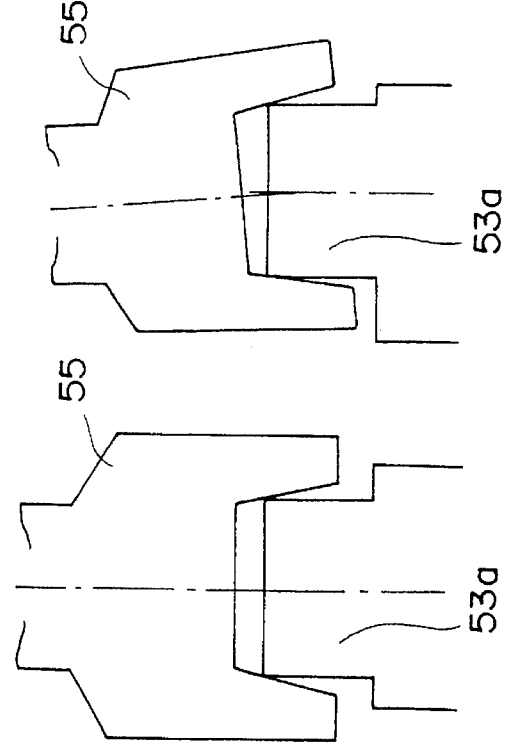
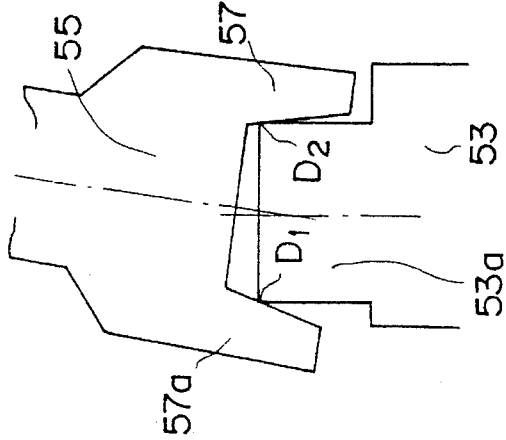

STRUCTURE OF DRIVE SECTION OF POWER TOOL

BACKGROUND OF THE INVENTION

1. Field of the Invention

This invention relates to a structure of a drive section of a power tool. Especially, it relates to improvement of a structure which converts rotational movement of a motor into vibrational movement of an arm with a tool such as a sander.

2. Description of the Prior Art

Conventionally, a structure C as shown in FIG. 5 is known, as a structure of a drive section which converts rotational movement of a motor into vibrational movement of an arm with a tool such as a sander.

The structure C of the drive section has a motor 51 fixed to a housing (not shown). A shaft 53 is fixed to an output shaft 52 of the motor 51. An eccentric section 53a is formed at the tip portion of the shaft 53. The middle portion of the shaft 53 is rotatably supported by a ball bearing 54.

On the other hand, a vibratory arm 55 is vibratably supported by a pin 56. A recess 57 is formed at the back end portion of the vibratory arm 55. The eccentric section 53a is inserted into the recess 57, and thereby the eccentric section 53a is connected to the vibratory arm 55. Both side walls of the recess 57 are formed as contact sections 57a and 57b. The outer circumferential surface (cam surface) of the eccentric section 53a slidably contacts the inside surface of these contact sections 57a and 57b. Moreover, a vibratory member 58 is fixed to the tip portion of the vibratory arm 55. The vibratory member 58 vibrates in the direction as shown by an arrow X in FIG. 5.

FIG. 6 is a sectional view for explaining about operation of each member at the time when rotational movement of the motor 51 is converted into vibrational movement. In addition, FIGS. 6(A1)–6(A4) are views showing a structure of the drive section taken along the line P—P in FIG. 5. FIGS. 6(B1)–6(B4) are plan views of FIGS. 6(A1)–6(A4), respectively. FIG. 6(A1) corresponds to FIG. 6(B1). Hereinbelow, FIGS. 6(A2)–6(A4) correspond to FIGS. 6(B2)–6(B4), respectively.

In FIG. 6, a reference numeral $O_1$ is a center of the shaft 53. A reference numeral $O_2$ is a center of the eccentric section 53a.

When the shaft 53 rotates by 90 degrees in the clockwise direction (as shown by an arrow Y in FIG. 6) from the state as shown in FIGS. 6(A1) and 6(B1), the eccentric section 53a also rotates by 90 degrees in the clockwise direction. And, the relationship between the eccentric section 53a and the contact sections 57a, 57b becomes the state as shown in FIGS. 6(A2) and 6(B2). Namely, in the direction of the x axis, the center $O_2$ moves in the right direction as shown by an arrow Z in FIG. 6(A1), by a distance L between the center $O_1$ and the center $O_2$. Thereby, the contact sections 57a and 57b move by the distance L in the right direction along the x axis.

When the shaft 53 further rotates by 90 degrees in the clockwise direction from the state as shown in FIGS. 6(A2) and 6(B2), the relationship between the eccentric section 53a and the contact sections 57a, 57b becomes the state as shown in FIGS. 6(A3) and 6(B3). Thereby, the contact sections 57a and 57b further move by the distance L in the right direction along the x axis.

When the shaft 53 further rotates by 90 degrees in the clockwise direction from the state as shown in FIGS. 6(A3) and 6(B3), the relationship between the eccentric section 53a and the contact sections 57a, 57b becomes the state as shown in FIGS. 6(A4) and 6(B4). Thereby, the contact sections 57a and 57b return by the distance L to the left direction along the x axis.

Furthermore, when the shaft 53 rotates by 90 degrees in the clockwise direction from the state as shown in FIGS. 6(A4) and 6(B4), the relationship between the eccentric section 53a and the contact sections 57a, 57b return to the state as shown in FIGS. 6(A1) and 6(B1). Thereby, the contact sections 57a and 57b further move back by the distance L in the left direction along the x axis.

The operation of the drive section C stated above is repeated. Thereby, the rotational movement of the motor 51 is converted into the vibrational movement of the vibratory arm.

However, there are some problems as follows in the structure of the drive section C stated above.

As shown in FIGS. 6(B1)–6(B4), angle portions D1 and D2 of the eccentric section 53a which abut against the contact surfaces of the contact sections 57a and 57b is formed at a right angle, and the sharp angle portions D1 and D2 slide on the contact surfaces of the contact sections 57a and 57b during swinging motion of the arm 53. For this reason, transfer of power from the motor 51 to the vibratory arm 55 is not performed smoothly. It becomes the cause of generation of vibration and noise. The angle portions D1, D2 and each of contact surfaces of the contact sections 57a, 57b are worn out. For this reason, it becomes the cause of generation of rattling.

The friction between the angle section D1,D2 and the contact surfaces of the contact sections 57a, 57b becomes the cause of producing heat.

SUMMARY OF THE INVENTION

An object of this invention is to solve these problems which the conventional structure of the drive section of a power tool has. Namely, this invention intends to provide a structure of the drive section of the power tool in which vibration does not generate, contact section of eccentric section and contact surface of vibratory arm are not worn out, and friction heat does not produce.

In order to attain the above mentioned object, this invention has features as follows.

Namely, the structure of the drive section of a power tool of this invention is as follows. An output axis of a motor has an eccentric portion, a vibratory arm is vibratably supported at its central portion, connecting section of the vibratory arm with the eccentric portion is formed in shape of two crotches or branches the eccentric portion and the vibratory arm are connected to each other in a manner that the eccentric portion is inserted between two crotches of the vibratory arm, thereby rotational movement of the output axis of the motor is converted into vibrational movement of the vibratory arm, and at least one of contact portion formed on the outer circumfrential surface of the eccentric portion or contact portions respectively formed on the inside surface of each of two crotches is formed in shape of a curved surface.

The above mentioned structure of the drive section of the power tool works as follows.

Namely, the eccentric section rotates according to the rotation of the output axis of the motor. By the rotational movement of the eccentric section, the vibratory arm which is connected with the eccentric section is vibrated.

The eccentric section and the connecting section of the vibratory arm are connected to each other. And at least one of the contact portion of the eccentric section or the contact portion of the vibratory arm is formed in shape of a curved surface. Thereby, state of contact between the eccentric section and the vibratory arm at the connecting section becomes approximately a rolling contact state. For this reason, when rotational movement of the motor is converted into vibrational movement of the power tool, friction is hardly generated.

According to the invention stated above, the eccentric section smoothly contacts the vibratory arm. For this reason, when the rotational movement of the eccentric section is converted into the vibrational movement of the vibratory arm, generation of vibration and wear, and increase of temperature due to friction, etc. are few.

BRIEF DESCRIPTION OF THE DRAWINGS

FIG. 3 is a sectional view for explaining about process of conversion to vibrational movement of a vibratory arm from rotational movement of a motor;

FIG. 6 is a sectional view for explaining about operation of the structure of FIG. 5.

DETAILED DESCRIPTION OF THE PREFERRED EMBODIMENT

Figure 1:
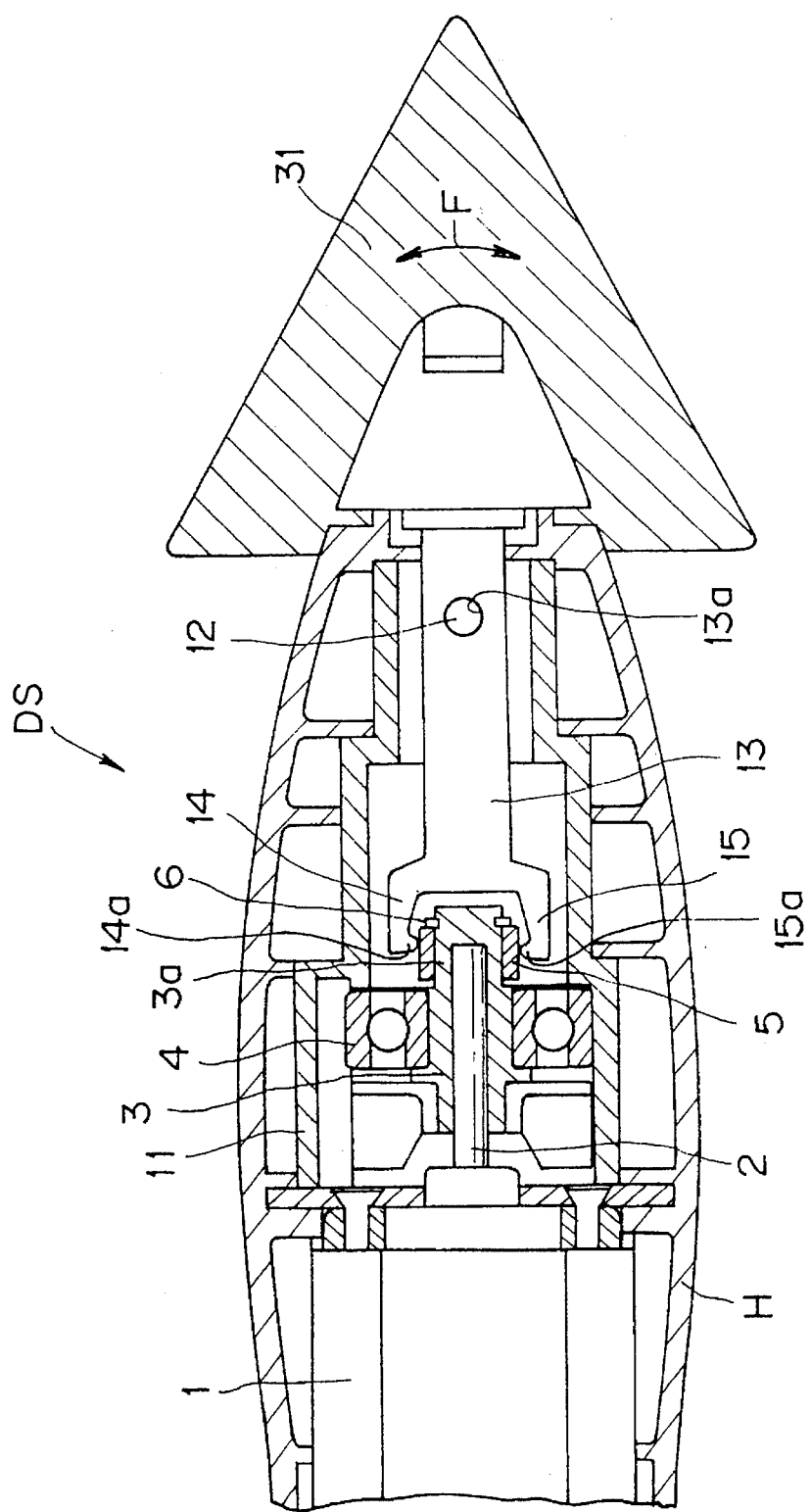
FIG. 1 is a horizontal sectional view of one example of structure of the drive section of a power tool according to this invention.

The first embodiment of this invention is shown in FIGS. 1 to 3. The first embodiment is an embodiment about a detail sander which grinds the surface of details or corner sections of building materials, etc..

Figure 2A:
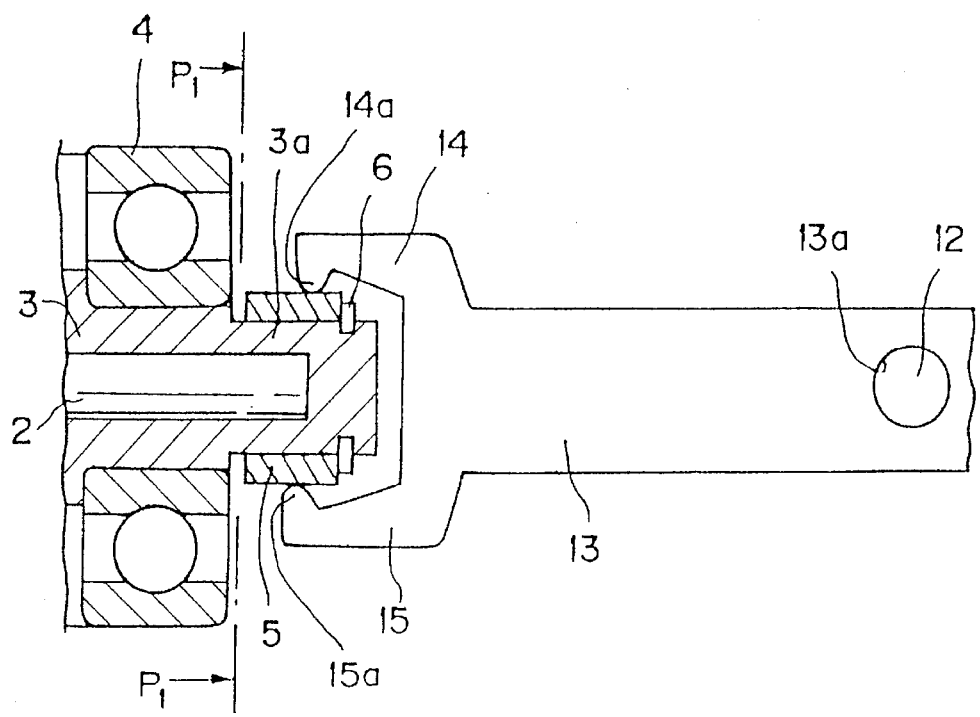
FIG. 2(A) is a horizontal sectional view of an essential portion of the same example, and 2(B) is a perspective view of a vibratory arm.
Figure 2B:
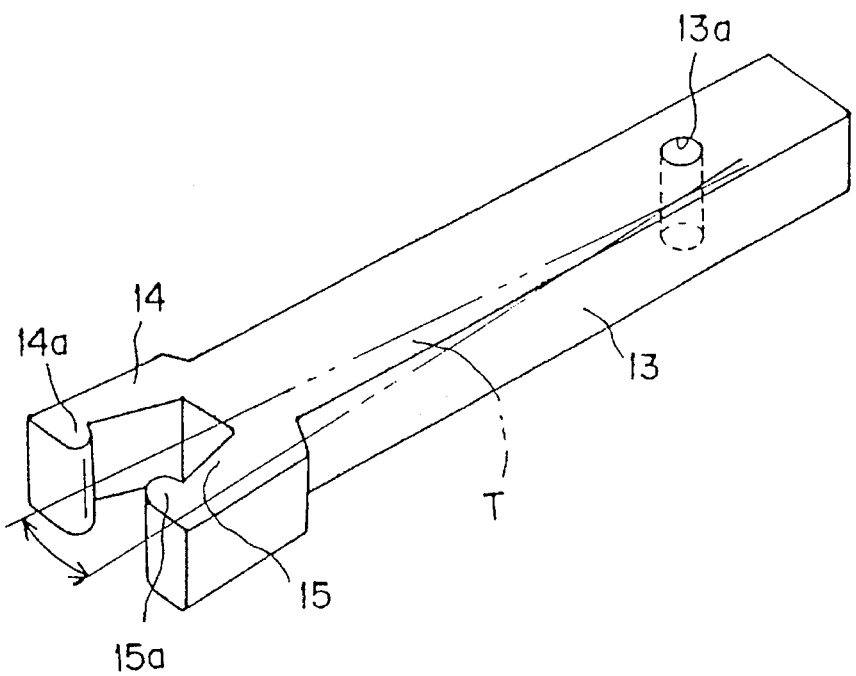

As shown in FIGS. 1 and 2(A), a detail sander DS comprises a housing H, a direct current motor 1, a gear case 11, and a working surface 31, etc.. The gear case 11 contains various kinds of components. The working surface 31 can vibrate in the direction shown by an arrow F (see FIG. 1). And, the working surface 31 has a surface with polish material, such as sanding paper. The working surface 31 forms a tool to be swinging.

The motor 1 has an output axis 2. This output axis 2 is inserted in a shaft 3. An eccentric section 3a is formed at the tip portion of the shaft 3. The center of the eccentric section 3a is eccentric to the center of the output axis 2. The central part of the shaft 3 is rotatably supported by a ball bearing 4. A cylindrical ring 5 is fixed to the tip portion of the eccentric section 3a. And the ring 5 is prevented from coming off from the eccentric section 3a by a snap ring 6.

A vibratory arm 13 is arranged at the front side (right side in FIG. 1) of the gear case 11 so that an axis of the vibratory arm 13 is parallel to an axis of the gear case 11. And, a pin 12 is inserted in an aperture 13a formed at the central part of the vibratory arm 13. By this construction, the vibratory arm 13 can vibrate in vibrational area T (see FIG. 2(B)) about the pin 12.

The back end (left end in FIG. 1) of the vibratory arm 13 is divided into two crotches or branches, thereby one pair of contact sections 14 and 15 are formed at the back end of the vibratory arm 13. Each of half pillar like projections 14a and 15a is respectively formed on the inner surface of the tip portions of the contact sections 14 and 15, so as to project inwardly. Each axis of these projections 14a and 15a is extended perpendicularly to the axis of the vibratory arm 13, respectively.

Each tip of the projections 14a and 15a contacts the outer circumferential surface of the ring 5, and, catches the ring 5 between the projection 14a and the projection 15a. By this construction, the vibratory arm 13 is connected with the eccentric section 3a.

Following is explanation of operation of the detail sander DS constituted as mentioned above.

FIGS. 3(A1)–3(A4) are views of the structure of drive section taken along the line P1—P1 in FIG. 2(A). FIGS. 3(B1)–3(B4) are plan views of FIGS. 3(A1)–3(A4), respectively. In addition, in FIG. 3, a reference numeral $O_1'$ is a center of the shaft 3. A reference numeral $O_2'$ is a center of the eccentric section 3a.

In FIGS. 3(A1) and 3(B1), the center $O_2'$ of the eccentric section 3a is located on the left side of the center $O_1'$ of the shaft 3 on the x axis. Distance between the center $O_1'$ and the center $O_2'$ is L. Thereby, the vibratory arm 13 is inclined with respect to the axis of the shaft 3 because the back end of the vibratory arm 13 is disposed on the left bide in FIG. 3(A1).

When the shaft 3 rotates by 90 degrees in the clockwise direction, the relationship between the eccentric section 3a and the contact sections 14 and 15 becomes the state as shown in FIGS. 3(A2) and 3(B2). Namely, the center $O_2'$ is disposed upwardly of the center $O_1'$ on the y axis, and the contact sections 14 and 15 move by the distance L in the right direction along the x axis, and the axis of the vibratory arm 13 becomes parallel to the axis of the shaft 3.

When the shaft 3 further rotates by 90 degrees in the clockwise direction, from the state as shown in FIGS. 3(A2) and 3(B2), the relationship between the eccentric section 3a and the contact sections 14 and 15 becomes the state as shown in FIGS. 3(A3) and 3(B3). Namely, the contact sections 14 and 15 further move by the distance L in the right direction along the x axis, and the axis of the vibratory arm 13 is inclined to the axis of the shaft 3 because the back end portion of the vibratory arm 13 is disposed on the left side in FIG. 3(A3).

When the shaft 3 further rotates by 90 degrees in the clockwise direction, from the state as shown in FIGS. 3(A3) and 3(B3), the relationship between the eccentric section 3a and the contact sections 14 and 15 becomes the state as shown in FIGS. 3(A4) and 3(B4). Namely, the contact sections 14 and 15 move by the distance L into the left direction along the x axis, and the axis of the vibratory arm 13 becomes parallel to the axis of the shaft.

Furthermore, when the shaft 3 rotates by 90 degrees in the clockwise direction from the state as shown in FIGS. 3(A4) and 3(B4), the relationship between the eccentric section 3a and the contact sections 14 and 15 return back to the state as shown in FIGS. 3(A1) and 3(B1). Namely, the contact sections 14 and 15 return by the distance L in the left direction along the x axis, thereby the vibratory arm 13 is inclined again with respect to the axis of the shaft 3 because the back end of the vibratory arm 13 is disposed on the left side in FIG. 3(A1).

As mentioned above, the rotational movement of the shaft 3 is converted into the vibrational movement of the vibratory arm 13 through the eccentric section 3*a*. By the vibrational movement of the vibratory arm 13, the tip potion of the vibratory arm 13 vibrates, and abrasion by polish material of the working surface 31 is performed.

During the operation of the drive section, the projections 14*a* and 15*a* of the vibratory arm 13 contact the outer circumferential surface of the ring 5. The projections 14*a* and 15*a* are formed in shape of a half pillar, the projection 14*a* contacts the outer circumferential surface of the ring 5 at a contact portion T1, and the projection 15*a* contacts the outer circumferential surface of the ring 5 at a contact portion T2. Thereby, contact state of the contact portions T1 and T2 becomes approximately a rolling contact on a swinging plane extended in the swinging direction of the arm 13, respectively. For this reason, at the contact portions T1 and T2, the projections 14*a* and 15*a* smoothly contact the outer circumferential surface of the ring 5. Therefore, at the contact portions T1 and T2, generation of friction is few.

Figure 4A:
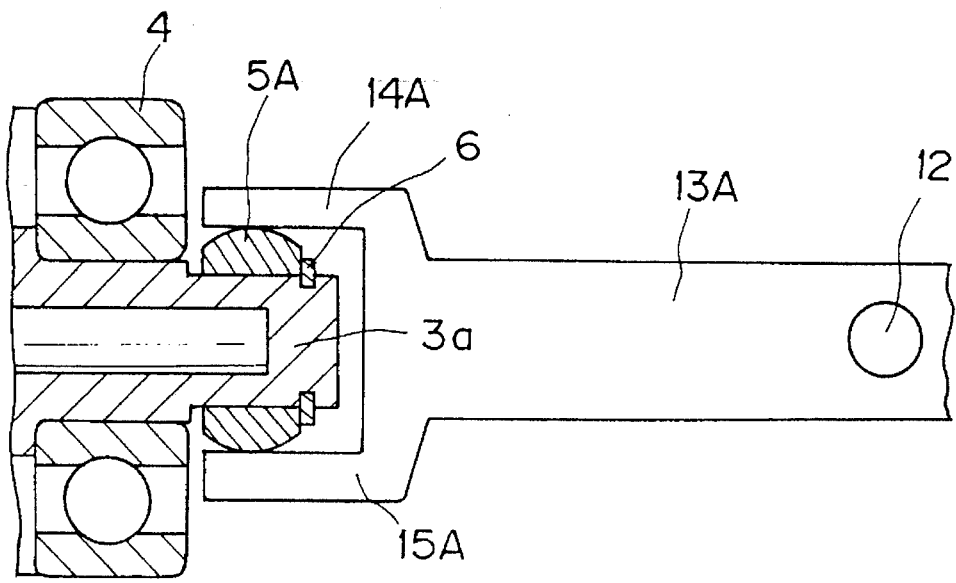
FIG. 4(A) is a horizontal sectional view showing an essential portion of another example of the invention.

The second embodiment of this invention is shown in FIG.4(A). In the first embodiment stated above, the half pillar like projections 14*a* and 15*a* of the vibratory arm 13 contact the ring 5 whose outer surface is parallel to the center axis of the ring 5, that is, the ring 5 has a cylindrical shape, and the generatrix of the ring is parallel to the center axis of the ring 5. However, in the second embodiment, the inner surface of contact sections 14A and 15A are respectively formed flat and a ring 5A is formed in such a manner that the central part of the ring 5A is raised in the radial direction so as to form a curved surface. And, the top of the outer circumferential surface of the ring 5A contacts each of the inner surfaces of the contact sections 14A and 15A.

The contact between the inner surface of the contact sections 14A, 15A and the outer circumferential surface of the ring 5A forms a rolling contact on the swinging plane, as well as the first embodiment. Thereby, the contact sections 14A and 15A can smoothly contact the ring 5A.

Figure 4B:
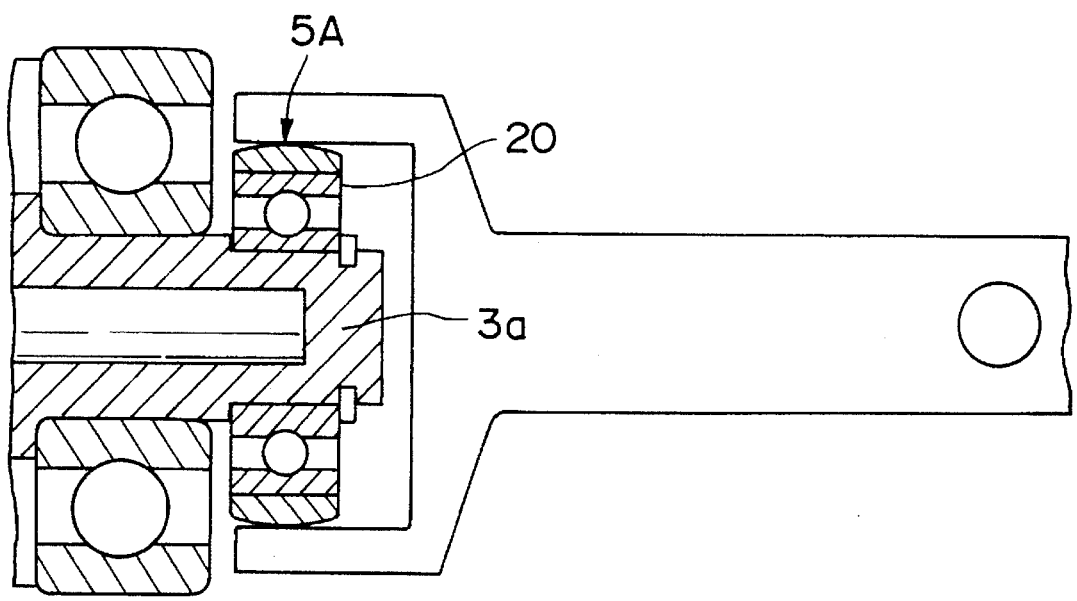
FIG. 4(B) is a horizontal sectional view showing an essential portion of another example of the invention.
Figure 4C:
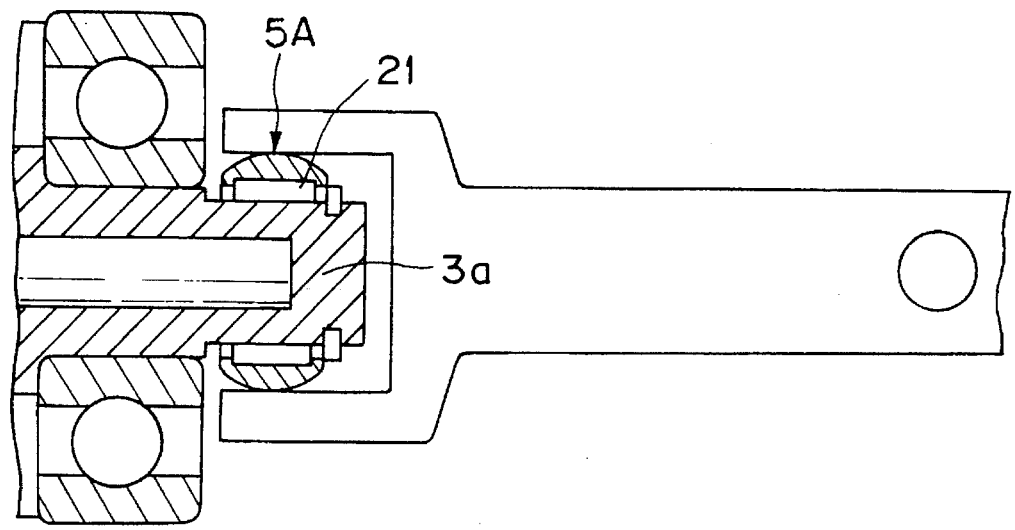
FIG. 4(C) is a horizontal sectional view showing an essential portion of another example of the invention.
Figure 5:
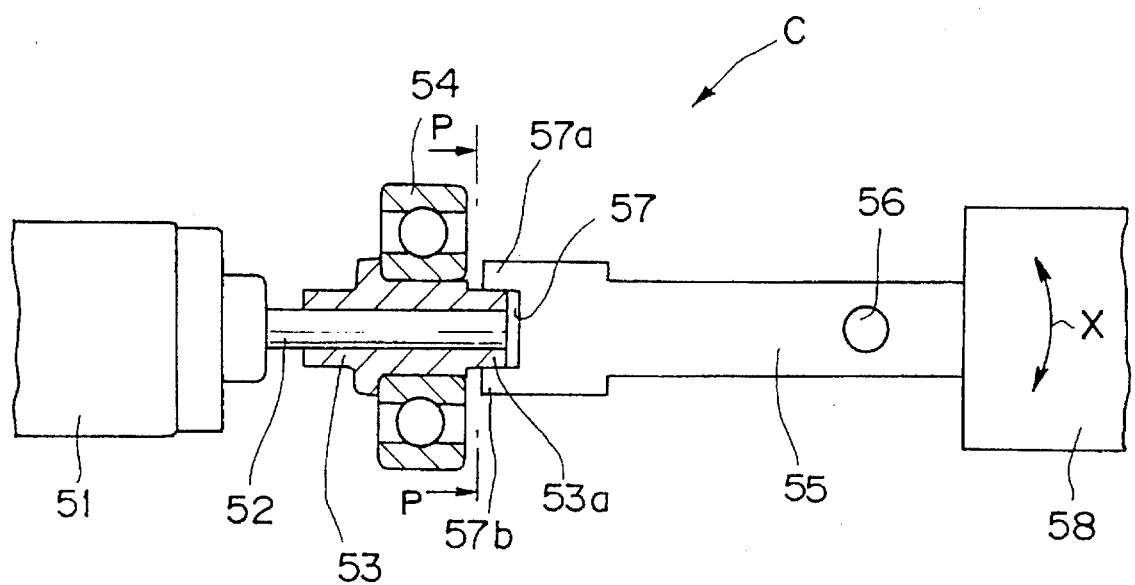
FIG. 5 is a horizontal sectional view of a conventional structure.

For the ring 5A, it is desirable to use a ball bearing 20 as shown in FIG. 4(B) or a ball metal, etc.. Moreover, by using the ball metal which has needle bearings 21 as shown in FIG. 4(C) on the outer circumferential surface of the eccentric section 3*a*, the conversion of movement is done more smoothly.

What is claimed is:

1. Structure of drive section of a power tool for giving a swinging motion to a tool such as a sander, which comprises:

an output shaft portion of a motor having a rotational axis and an eccentric portion deviating from said rotational axis;

a vibratory arm capable of vibrating about a vibrating axis and holding said tool at its one end, said vibrating axis being perpendicular to said rotational axis; and connecting section of the other end of said vibratory arm with said eccentric portion formed in shape of two crotches, said eccentric portion and said vibratory arm being connected to each other in such a manner that said eccentric portion is inserted between said two crotches of said vibratory arm, thereby rotational movement of said output shaft portion of said motor being converted into vibrational movement of said vibratory arm, said connecting section having a first contact portion formed on the outer circumferential surface of said eccentric portion and second contact portions respectively formed on the inside surface of each of said two crotches, and at least one of said first contact portion and each of said second contact portions comprising a curved surface of which a contour curves on a plane perpendicular to said vibrating axis.

2. The structure of drive section of the power tool according to claim 1, wherein said second contact portions comprise half pillar like projections of which axes are extended perpendicularly to the axial direction of said vibratory arm, and each of said half pillar like projections contacts said first contact portion.

3. The structure of drive section of the power tool according to claim 1, wherein said first contact portion comprises an outer circumferential surface of which a central part is raised in its radial direction so as to form said curved surface, and the top of said curved surface contacts said second contact portions.

4. The structure of drive section of the power tool according to claim 1, wherein a ring is attached to the outer circumferential portion of said eccentric portion, and an outer surface of said ring contacts said second contact portions.

5. The structure of drive section of the power tool according to claim 4, wherein a generatrix of said outer surface of said ring is parallel to the axial direction of said ring, and said each of said second contact portions comprises said curved surface.

6. The structure of drive section of the power tool according to claim 4, wherein, on said outer surface, said ring has said curved surface of which a central part is raised outside to the radial direction of said ring.

7. The structure of drive section of the power tool according to claim 4, wherein said ring is a ball bearing.

8. The structure of drive section of the power tool according to claim 4, wherein said ring is a bearing with spherical outside surface.

9. The structure of drive section of the power tool according to claim 8, wherein said bearing has needle rollers on its inner circumferential surface.

10. The structure of drive section of the power tool according to claim 4, wherein said ring is rotatably attached to said eccentric portion.

11. Structure of drive section of a power tool for giving a swinging motion to a tool such as a sander, which comprises:

an output shaft portion of a motor having a rotational axis and an eccentric portion deviating from said rotational axis;

a vibratory arm vibratably supported at a predetermined position and holding said tool at its one end; and connecting section of the other end of said vibratory arm with said eccentric portion formed in shape of two crotches, said eccentric portion and said vibratory arm being connected to each other in such a manner that said eccentric portion is inserted between said two crotches of said vibratory arm, thereby rotational movement of said output shaft portion of said motor being converted into vibrational movement of said vibratory arm, said connecting section having a first contact portion formed on the outer circumferential surface of said eccentric portion and second contact portions respectively formed on the inside surface of each of said two crotches, said second contact portions comprising half pillar like projections of which axes are extended perpendicularly to the axial direction of said vibratory arm, and each of said half pillar like projections contacts said first contact portion, and at least one of said first contact portion and each of said second contact portions comprising a curved surface of which a contour curves on a plane perpendicular to said vibrating axis.

12. Structure of drive section of a power tool for giving a swinging motion to a tool such as a sander, which comprises:

an output shaft portion of a motor having a rotational axis and an eccentric portion deviating from said rotational axis;

a vibratory arm vibratably supported at a predetermined position and holding said tool at its one end; and connecting section of the other end of said vibratory arm with said eccentric portion formed in shape of two crotches, said eccentric portion and said vibratory arm being connected to each other in such a manner that said eccentric portion is inserted between said two crotches of said vibratory arm, thereby rotational movement of said output shaft portion of said motor being converted into vibrational movement of said vibratory arm, said connecting section having a first contact portion formed on the outer circumferential surface of said eccentric portion and second contact portions respectively formed on the inside surface of each of said two crotches, said first contact portion comprising an outer circumferential surface of which a central part is raised in its radial direction so as to form said curved surface, and the top of said curved surface contacts said second contact portions, and at least one of said first contact portion and each of said second contact portions comprising a curved surface of which a contour curves on a plane perpendicular to said vibrating axis.

* * * * *